Sept. 11, 1945.  F. O. CALVIN ET AL  2,384,597
MOTION PICTURE APPARATUS
Original Filed Jan. 9, 1940  2 Sheets-Sheet 1
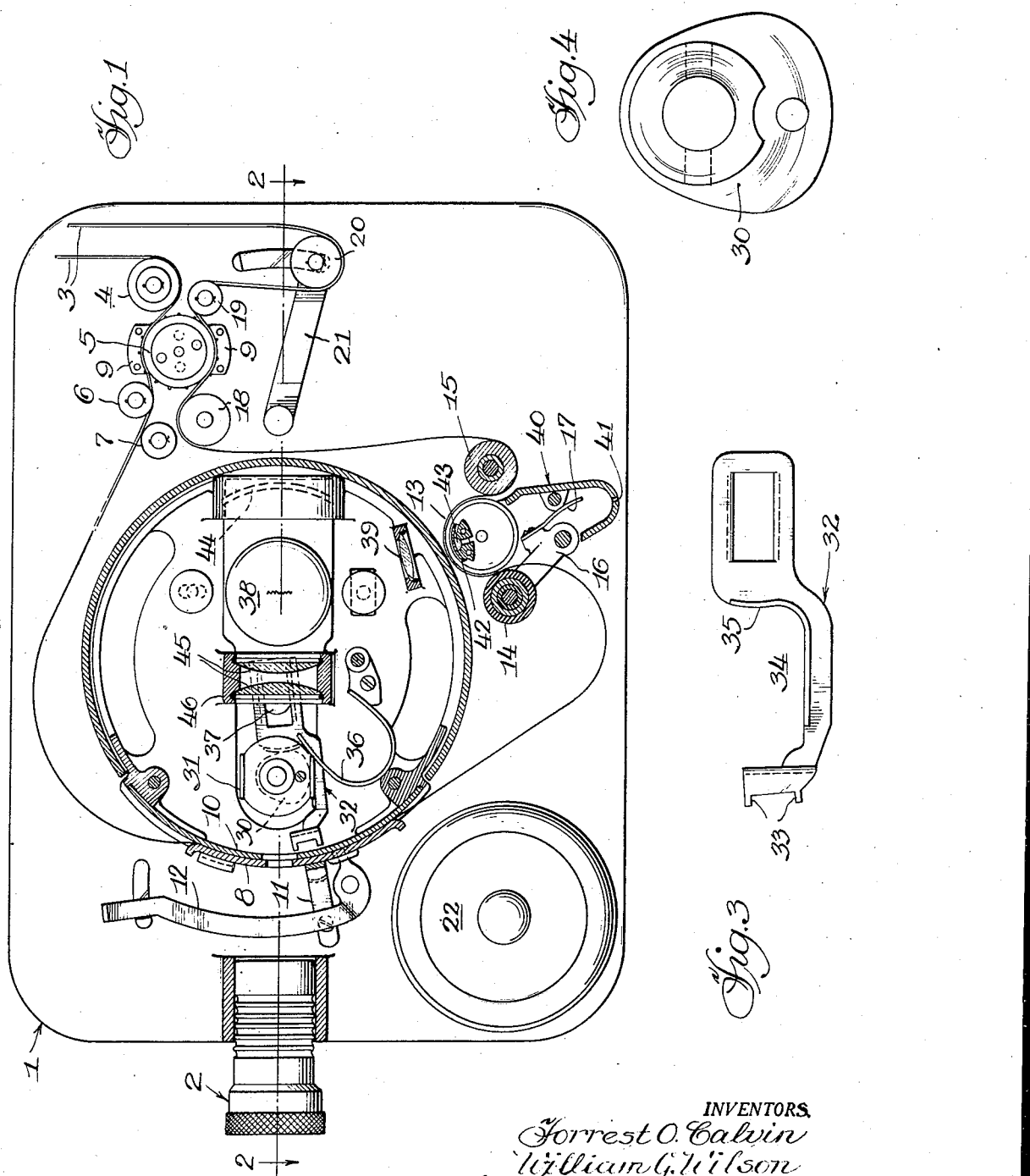
INVENTORS.
Forrest O. Calvin
William G. Wilson
and Thomas R. Smith
Parkinson & Lane Attys

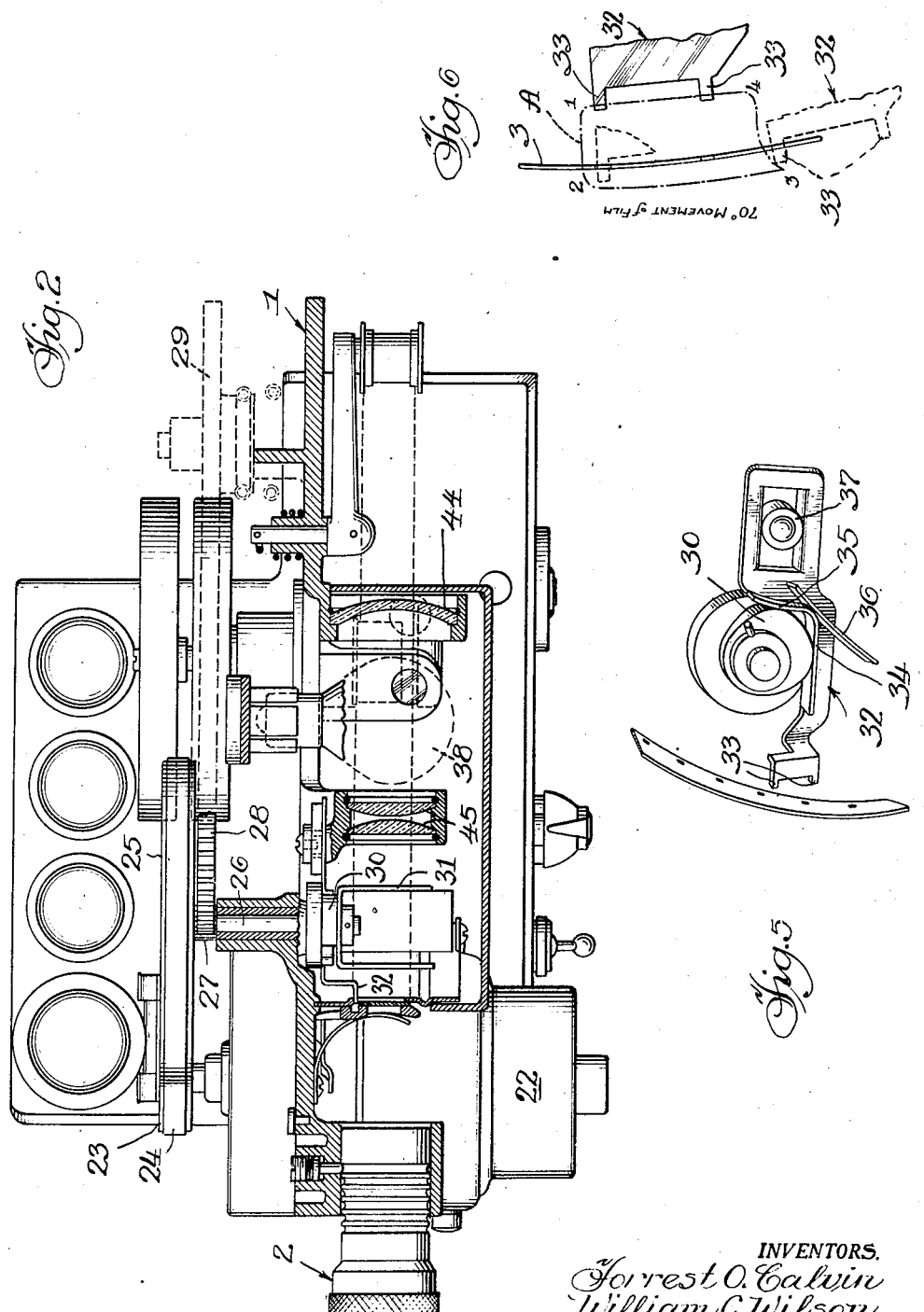

Patented Sept. 11, 1945

2,384,597

UNITED STATES PATENT OFFICE 2,384,597

MOTION-PICTURE APPARATUS

Forrest O. Calvin, Kansas City, Mo., William G. Wilson, Merriam, Kans., and Thomas R. Smith, Newton, Iowa, assignors to Movie-Mite Corporation, Kansas City, Mo., a corporation of Missouri Original application January 9, 1940, Serial No. 313,088, now Patent No. 2,319,111, dated May 11, 1943. Divided and this application October 13, 1942, Serial No. 461,837

3 Claims. (Cl. 88—18.4)

The present invention relates to motion picture apparatus, and more particularly to the provision of an intermittent mechanism or assembly including a cam followed by a double faced follower having means for intermittent feeding of the film. In the novel illustrative embodiment, the cam shaft also serves as the shutter shaft, pinion shaft and the driven pulley shaft, and the shutter and cam combine to act as guides for the follower member.

In the present novel embodiment the invention comprehends the use of but a single cam for imparting all necessary motion to the film moving member. This permits an extremely simple construction having a minimum number of parts and requiring a minimum amount of attention.

The present invention is a division of our copending application Serial No. 313,088, filed January 9, 1940, now Patent Number 2,319,111, issued May 11, 1943.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of change and modification, and comprehends other details, arrangements of parts, features and constructions without departing from the spirit of the invention.

In the drawings:

Figure 1 is a view in vertical cross-section through a motion picture projector and showing more particularly the arrangement and location of the cam and follower.

Fig. 2 is a view in horizontal cross-section taken in a plane represented by the line 2—2 of Fig. 1.

Fig. 3 is a view in side elevation of the film moving member and follower.

Fig. 4 is a view in side elevation of the cam construction.

Fig. 5 is a view in perspective of the assembly of the film moving member and cam and showing a section of the film to more clearly bring out their relationship when the film moving member is retracted.

Fig. 6 is a diagrammatic showing of the end of the film moving member and manner of advancing the film through the projector.

Referring more particularly to the disclosure in the drawings, the novel illustrative embodiment therein disclosed comprises a mounting plate 1 upon which is suitably mounted the projecting apparatus, and in the forward part of which is adjustably mounted a lens 2. The film 3 is fed from the feed roll (not shown) over the roller 4, and thence over a sprocket 5 and between guide rollers 6 and 7 to the picture aperture positioned in a pressure plate 8. The film travels in such a path as to require a minimum of supporting parts or rollers, and these parts or rollers are so placed as to make the film path of such contour that the film will not be subjected to sharp bends or other mishandling. The film 3 is held onto the top of the sprocket by suitable sprocket retainers 9.

The pressure plate 8 holds the film between its surface and the surface of the apertured gate plate 10 by means of pressure applied by a lever spring 11. Framing is accomplished by moving the lever 12 which in turn moves the aperture in the pressure plate 8 up or down to the correct alignment. The frame lever 12 retains the pressure plate in its correct position. This pressure plate 8 rests in the film groove in the gate plate 10, and this pressure plate is moved up or down in this groove by operation of the lever 12 to thereby frame the film. The pressure plate 8 and the gate plate 10, as well as all rollers contacting the film at any point in the projector, with the exception of the sound drum, are preferably relieved over the sound track and picture areas of the film to thereby provide protection for the film.

Although the invention is shown as embodied in a motion picture projector of the sound projection type, it is to be understood that it is not limited thereto, but is admirably adapted for use in motion picture apparatus of the silent type. However, in the illustrative embodiment the film, after leaving the confines of the pressure plate 8 and gate plate 10, is looped and guided over the sound drum 13 and held against it by means of a pad roller 14, and as it leaves the sound drum it is guided by means of a roller 15. The roller 14 as shown is mounted on a pivotally mounted arm 16 with a spring 17 holding the roller against the sound drum with the required tension. The film in leaving the sound drum is then passed over a guide roller 18, and thence over the under surface of the sprocket 5 and over the guide roller 19. The rollers 18 and 19 guide the film over the bottom surface of the sprocket, and these rollers, in a manner similar to the guide rollers 4, 6 and 7 which are positioned adjacent the upper surface of the sprocket 5, are so located that the natural tendency of the film to straighten out from the bends imposed thereon keeps the film on the arc. The sprocket retainer 9 also locks the film on the lower surface of the sprocket in a manner similar to that described in connection with the upper surface of the sprocket. The film after passing the guide roller 19 then passes over a snubber roller 20, which is mounted upon a spring control arm 21. From there the film passes to the take-up reel (not shown).

The power unit for feeding the film and for operating the motion picture apparatus comprises a motor 22 having a drive pulley 23 mounted upon an end of the motor shaft, and this drive pulley in turn drives the apparatus through a belt 24 and driven pulley 25 secured on and rotating a pinion shaft 26. Also mounted upon this pinion shaft is a small pinion gear 27 meshing with and driving a large idler gear 28, which in turn meshes with and drives a sprocket gear 29.

Secured upon the inner end of the driven shaft 26 by pin or the like 29 is a cam 30, and pinned or otherwise secured to this cam is a shutter 31. The shaft 26 serves to drive the motion picture apparatus or projector mechanism, and the cam 30 and shutter 31 operate together to form lateral guides for the claw 32. This claw is provided with projections or teeth 33 which engage the film, and this motion is controlled by the cam 30 which bears upon the flat bottom surface 34 of the follower and on the convex back follower surface 35 of the claw. A spring 36 holds the claw against the cam 30 during its motion and serves to drive the claw in its upward and forward travel with the rear end of the claw being pivoted upon a bushing or pivot 37. The use of the double follower surface on the claw operating against the novel single cam and held in place against the cam face by means of the spring 36 provides extreme simplicity of the parts necessary for moving the film in its proper intermittent motion. Figure 6 shows the path A (1-2-3-4) described by the projections or teeth 33 in moving the film through the apparatus.

The apparatus or projector mechanism is so constructed and arranged as to require but a single lamp or light source 38 for projection of the picture, and in the illustrative embodiment for scanning the sound track. This lamp is positioned on the inner line of the film and throws light through the sound condenser 39 onto the sound track of the film 3 as it passes over the sound drum 13. The sound drum cover or housing 40 is provided with a mechanical slit 41. Associated with the sound drum 13 is a mask 42 which serves as the projection aperture for the sound track of the film. Immediately behind or below this mask is a semi-cylindrical or cylindrical lens 43.

The lamp 38, which is positioned on the center line of the film, throws its light through the sound condenser 39 onto the sound track of the film as it passes over the sound drum. The reflector 44 mounted to the rear of the lamp, and the condensers 45 mounted to the front of the lamp and within the housing 46, gather light from the lamp.

In the operation of the mechanism, the claw 32 which is provided with teeth 33 which move the film through the gate assembly, is actuated by the cam 30 and follower surfaces 34 and 35. The spring 36 holds the follower surfaces of the claw against the cam, and the contour of the cam and its followers is such that the follower surfaces engage the cam at two points, one on the bottom which controls up and down movement, and the other at the rear which controls the in and out motion of the claw, the path taken by the claw being clearly disclosed in Figure 6. The cam and follower surfaces are so designed, constructed and arranged that the teeth 33 go straight into the sprocket holes of the film and hesitate there before downward motion is imparted. This downward motion starts slowly, picks up speed in the middle of the stroke or cycle, and then stops slowly. The claw 32 stops at the bottom of its travel and rises slowly before being pulled out of the sprocket holes. This eliminates all unnecessary jerking action in starting the film downward, eliminates all sawing action normally caused by the teeth on travelling in the same arc as the film, as well as any sawing action which would normally be caused by the claw teeth dragging over the film on being withdrawn. The slow motion at the end of the downward stroke or motion also permits keeping at a minimum the tension required to keep the inertia of the film from tending to carry it past its proper stopping point. This novel cyclic motion, which makes for the above mentioned acceleration and deceleration, is of extreme importance. The film 3 is thus moved down over the gate plate 10 by the claw 32 actuated by the cam 30, and the claw follower surfaces 34 and 35 are held against the cam by a spring 36. Light is concentrated on the picture area by the reflector 44 and condenser 45, and this light is cut off from the film during its intermittent motion by rotation of the barrel shutter 31.

Having thus disclosed the invention, we claim:

1. In a motion picture projector, mechanism for moving the film in its proper intermittent motion through the projector and comprising a member having a claw at one end adapted to engage and move the film and a cam follower consisting of a flat bottom surface and a convex rear surface, said follower forming part of said member and being located adjacent the opposite end of said claw the bottom follower surface controlling the up and down movement of the claw, and the convex rear follower surface controlling the in and out motion of the claw to give a predetermined cyclic motion in which the teeth of the claw go straight into the sprocket holes of the film and hesitate there before downward motion is imparted, a continuously rotating drive shaft, a single cam mounted on the shaft and adapted to control the path of the member, and spring means for continuously urging the bottom and rear follower surfaces into contact with the cam.

2. In a motion picture apparatus, drive mechanism for feeding the film intermittently through the apparatus and including a driven shaft, a cam and shutter secured on and rotatable by the shaft, a substantially horizontally arranged cam follower pivotally mounted adjacent its rear end and consisting of a film moving claw at its forward end and a double follower surface intermediate its ends including a bottom flat surface and a convex rear surface maintained in contact with the cam at two spaced points and having its motion controlled by the contour of the cam for intermittent feeding of the film with the bottom follower surface controlling the up and down movement of the claw, and the convex rear follower surface controlling the in and out motion of the claw to give a predetermined cyclic motion in which the teeth of the claw go straight into the sprocket holes of the film and hesitate there before downward motion is imparted, the cam being so constructed and arranged as to impart all necessary motion to the film moving member, and spring means for continuously urging the bottom and rear follower surfaces into contact with the cam.

3. In a motion picture projector, mechanism for moving the film in its proper intermittent motion through the projector and comprising a member having a claw adapted to engage and intermittently move the film through the projector and a cam follower consisting of a bottom and rear follower surface forming part of said member and being located adjacent the opposite end of said claw, the bottom follower surface controlling the up and down movement of the claw, and the rear follower surface controlling the in and out motion of the claw to give a predetermined cyclic motion in which the teeth of the claw go straight into the sprocket holes of the film and hesitate there before downward motion is imparted, a single cam adapted to engage the follower surfaces for moving the member in a predetermined path and a spring for continuously urging these follower surfaces into contact with the face of the cam whereby the cam controls the movement of the member and film.

FORREST O. CALVIN.
WILLIAM G. WILSON.
THOMAS R. SMITH.